US012282320B2

(12) United States Patent
Reynolds et al.

(10) Patent No.: US 12,282,320 B2
(45) Date of Patent: Apr. 22, 2025

(54) ADDING MODEL STATE TO HUMAN MACHINE INTERFACE (HMI) VIEWS

(71) Applicant: Rockwell Automation Technologies, Inc., Mayfield Heights, OH (US)

(72) Inventors: Jordan C. Reynolds, Austin, TX (US); John J. Hagerbaumer, Mequon, WI (US); Troy W. Mahr, Pleasant Prairie, WI (US); Thomas K. Jacobsen, Wake Forest, NC (US); Giancarlo Scaturchio, Pisa (IT)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 221 days.

(21) Appl. No.: 17/843,122

(22) Filed: Jun. 17, 2022

(65) Prior Publication Data
US 2023/0409021 A1    Dec. 21, 2023

(51) Int. Cl.
*G05B 19/418*    (2006.01)
*G05B 19/042*    (2006.01)

(52) U.S. Cl.
CPC ...  *G05B 19/41885* (2013.01); *G05B 19/0426* (2013.01); *G05B 2219/13144* (2013.01)

(58) Field of Classification Search
CPC .......... G05B 19/41885; G05B 19/0426; G05B 2219/13144; G05B 19/042
See application file for complete search history.

(56) References Cited

U.S. PATENT DOCUMENTS

| 10,216,177 B2 | 2/2019 | Gildert et al. |
| 11,740,624 B2 | 8/2023 | Ramamurthy et al. |
| 2012/0158623 A1* | 6/2012 | Bilenko ................. G06N 20/00 706/12 |

(Continued)

OTHER PUBLICATIONS

Notice of Allowance in U.S. Appl. No. 17/826,689, mailed Aug. 6, 2024, 19 pages.

(Continued)

*Primary Examiner* — Kamini S Shah
*Assistant Examiner* — Mohammed Shafayet (57) ABSTRACT

Various embodiments of the present technology generally relate to industrial automation environments. More specifically, embodiments include systems and methods to visualize machine learning model status in an industrial automation environment. In some examples, a machine learning component receives process inputs associated with industrial devices in the industrial automated environment. The machine learning component processes the inputs to generate machine learning outputs and transfers the machine learning outputs to influence one or more functions of the industrial devices. The machine learning component reports operational data characterizing the machine learning outputs. A Human Machine Interface (HMI) component displays a visualization of the machine learning component and receives the operational data from the machine learning component. In response to a user selection, the HMI component displays an expanded view of the machine learning component that comprises the operational data and that (Continued)

indicates relationships between the machine learning component and the industrial devices.

20 Claims, 7 Drawing Sheets

(56) References Cited

U.S. PATENT DOCUMENTS

| | | | |
|---|---|---|---|
| 2019/0102657 A1* | 4/2019 | Sayyar | G06F 18/23 |
| 2019/0354093 A1 | 11/2019 | Nguyen et al. | |
| 2020/0103838 A1 | 4/2020 | Bertinetti et al. | |
| 2020/0150638 A1* | 5/2020 | Mourzine | G05B 19/058 |
| 2021/0090105 A1 | 3/2021 | Nordmark et al. | |
| 2021/0097456 A1* | 4/2021 | Sayyarrodsari | G05B 19/4183 |
| 2021/0389748 A1* | 12/2021 | McAdam | G05B 19/4083 |
| 2022/0292338 A1* | 9/2022 | Nair | G06N 3/08 |
| 2022/0388160 A1 | 12/2022 | Yonemoto et al. | |
| 2022/0390515 A1* | 12/2022 | Pickerd | G01R 31/318307 |
| 2023/0145448 A1 | 5/2023 | Huber et al. | |

OTHER PUBLICATIONS

Non-Final Office Action issued by the United States Patent and Trademark Office in U.S. Appl. No. 17/851,628 on Sep. 13, 2024, 24 pages.

Notice of Allowance and Fee(s) Due issued by the United States Patent and Trademark Office in U.S. Appl. No. 17/826,689 on Aug. 6, 2024, 18 pages.

\* cited by examiner

ADDING MODEL STATE TO HUMAN MACHINE INTERFACE (HMI) VIEWS

TECHNICAL FIELD

Various implementations disclosed herein relate to industrial automation technology, and to visualizing machine learning model health.

BACKGROUND

Industrial manufacturing environments generate huge quantities of data at fast speeds making the extraction of enterprise-level insights challenging. In industrial automation environments, control systems are used to drive various operations along an industrial line. Control programs are developed by programmers and comprise a set of program tags to carry out an industrial operation. The program tags comprise chunks of the control code and correspond to Original Equipment Manufacturer (OEM) devices like industrial assets, machinery, devices, and sensors. Control code is used by control systems like Programmable Logic Controllers (PLCs) to drive the OEM industrial assets, machinery, devices, and sensors in an industrial process. Industrial manufacturing environments typically comprise a Human Machine Interfaces (HMIs) that allow plant operators to interact with the PLCs and the OEM assets. The HMIs comprise user interface systems that present the status and operational relationships of the PLCs and the OEM assets.

Machine learning algorithms are designed to recognize patterns and automatically improve through training and the use of data. Examples of machine learning algorithms include artificial neural networks, nearest neighbor methods, gradient-boosted trees, ensemble random forests, support vector machines, naïve Bayes methods, and linear regressions. A machine learning algorithm comprises an input layer and an output layer, wherein complex analyzation takes places between the two layers. Various training methods are used to train machine learning algorithms wherein an algorithm is continually updated and optimized until a satisfactory model is achieved. One advantage of machine learning algorithms is their ability to learn by example, rather than needing to be manually programmed to perform a task, especially when the tasks would require a near-impossible amount of programming to perform the operations in which they are used. However, industrial automation environments often fail to effectively integrate machine learning models to assist in control of the OEM assets. Moreover, the industrial automation environments do not efficiently surface the health of machine learning models.

OVERVIEW

This Overview is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Various embodiments of the present technology generally relate to solutions for integrating machine learning models into industrial automation environments. Some embodiments comprise a system to visualize machine learning model status in an industrial automation environment. In some examples, the system comprises a machine learning component and a Human Machine Interface (HMI) component. The machine learning component receives process inputs associated with industrial devices in the industrial automated environment. The machine learning component processes the inputs to generate machine learning outputs and transfers the machine learning outputs to influence one or more functions of the industrial devices. The machine learning component reports operational data characterizing the machine learning outputs to the HMI component. The HMI component displays a visualization of the machine learning component and receives the operational data from the machine learning component. In response to a user selection, the HMI component displays an expanded view of the machine learning component that comprises the operational data and that indicates relationships between the machine learning component and the industrial devices.

In some embodiments, an apparatus comprises computer readable storage media and processors operatively coupled with the computer readable storage media. The storage media store program instructions to visualize machine learning model status in an industrial automation environment. When the program instructions are executed by the processors, the computing apparatus receives process inputs associated with industrial devices in the industrial automated environment. The computing apparatus processes the inputs to generate machine learning outputs and transfers the machine learning outputs to influence one or more functions of the industrial devices. The computing apparatus displays a visualization of the machine learning component. In response to a user selection, the computing apparatus displays an expanded view of the machine learning component that comprises the operational data and that indicates relationships between the machine learning component and the industrial devices.

Some embodiments comprise a method to visualize machine learning status in an industrial automation environment. The method entails receiving process inputs associated with industrial devices in the industrial automated environment. The method continues with processing the inputs to generate machine learning outputs and transferring the machine learning outputs to influence one or more functions of the industrial devices. The method continues with reporting operational data characterizing the machine learning outputs. The method continues with displaying a visualization of the machine learning component and receiving the operational data. In response to a user selection, the method continues with displaying an expanded view of the machine learning component that comprises the operational data and that indicates relationships between the machine learning component and the industrial devices.

BRIEF DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

The drawings have not necessarily been drawn to scale. Similarly, some components or operations may not be separated into different blocks or combined into a single block for the purposes of discussion of some of the embodiments of the present technology. Moreover, while the technology is amendable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Various embodiments of the present technology generally relate to solutions for integrating machine learning models into industrial automation environments. More specifically, embodiments of the present technology include systems and methods for collecting machine learning operational data and visualizing machine learning models on Human Machine Interfaces (HMIs) within an industrial automation environment. The present technology serves to enhance industrial control by enabling the display of machine learning model health within HMIs to provide for on-site oversite of the models. Industrial automation environments often fail to effectively integrate machine learning models to assist in the live control of industrial devices. Moreover, the status and operations of machine learning models are not effectively surfaced to plant operators in the industrial automation environments. In an implementation of the present technology, machine learning models provide operational data that characterizes their outputs, predictions, and health to HMIs. The HMIs receive the data and display visualizations of the models for use by plant operators.

In accordance with the present disclosure, machine learning models may be connected with other elements within the industrial automation environment like industrial controllers and HMIs. In an embodiment, industrial controllers are connected to and control industrial devices. The industrial controllers receive process data generated by the devices and responsively feed the process data to a machine learning model. The machine learning model generates machine learning predictions to optimize the operations of the industrial devices. The machine learning models compiles operational data that characterizes the predictions and transfers the operational data to an HMI for display.

In accordance with the present disclosure, a machine learning model comprises one or more machine learning algorithms that are trained based on historical data and/or other types of training data. A machine learning model may employ one or more machine learning algorithms through which data can be analyzed to identify patterns, make decisions, make predictions, or similarly produce output that can inform control code and/or parameters. Examples of machine learning algorithms that may be employed solely or in conjunction with one another include artificial neural networks, nearest neighbor methods, ensemble random forests, support vector machines, naïve Bayes methods, linear regressions, or similar machine learning techniques or combinations thereof capable of predicting output based on input data. Determining which machine learning methods to use may depend on the specific purpose or functions required in a particular industrial setting. In some examples, a machine learning asset is integrated with an industrial controller and outputs control signaling that drives the industrial controller to control industrial devices.

Machine learning models may be deployed on premises in an industrial automation environment or off-site. For example, the machine learning model may be implemented in a data science environment and possess data pipelines to receive industrial data from industrial controllers and transfer machine learning operational data for display on HMIs. Machine learning models inherently have a useful lifecycle as the environment around it changes. Over time, the models may wear out like any other machine or sensor on an industrial line. In an implementation, an operator may view the health status of a machine learning model on an HMI and responsively deactivate the model using the HMI when the performance metrics of the model are not satisfactory. Thus, the machine learning assets disclosed herein may be periodically replaced and/or retrained to maintain the integrity of machine learning outputs.

To accompany the use of machine learning models, corresponding faceplates, displays, HMIs, and the like are contemplated herein to provide intuitive representations and interfaces to models on-site. A faceplate may comprise basic controls and/or visuals relevant to the to assist in visualizing a model for to manage the model's operations within the industrial environment. In this manner, machine learning can be brought into the on-site user experience. For example, an operator can view or use a kiosk within the industrial automation environment to perform a task such as reviewing machine learning control signaling, accessing model health, identifying model prediction accuracy, and/or other types of interaction with the machine learning model. The faceplate may also be useful for performing slightly more complex tasks such as offsetting parameters, providing inputs, tuning parameters of the model, overriding the model, checking the status of the model, or taking the model offline.

Figure 1:
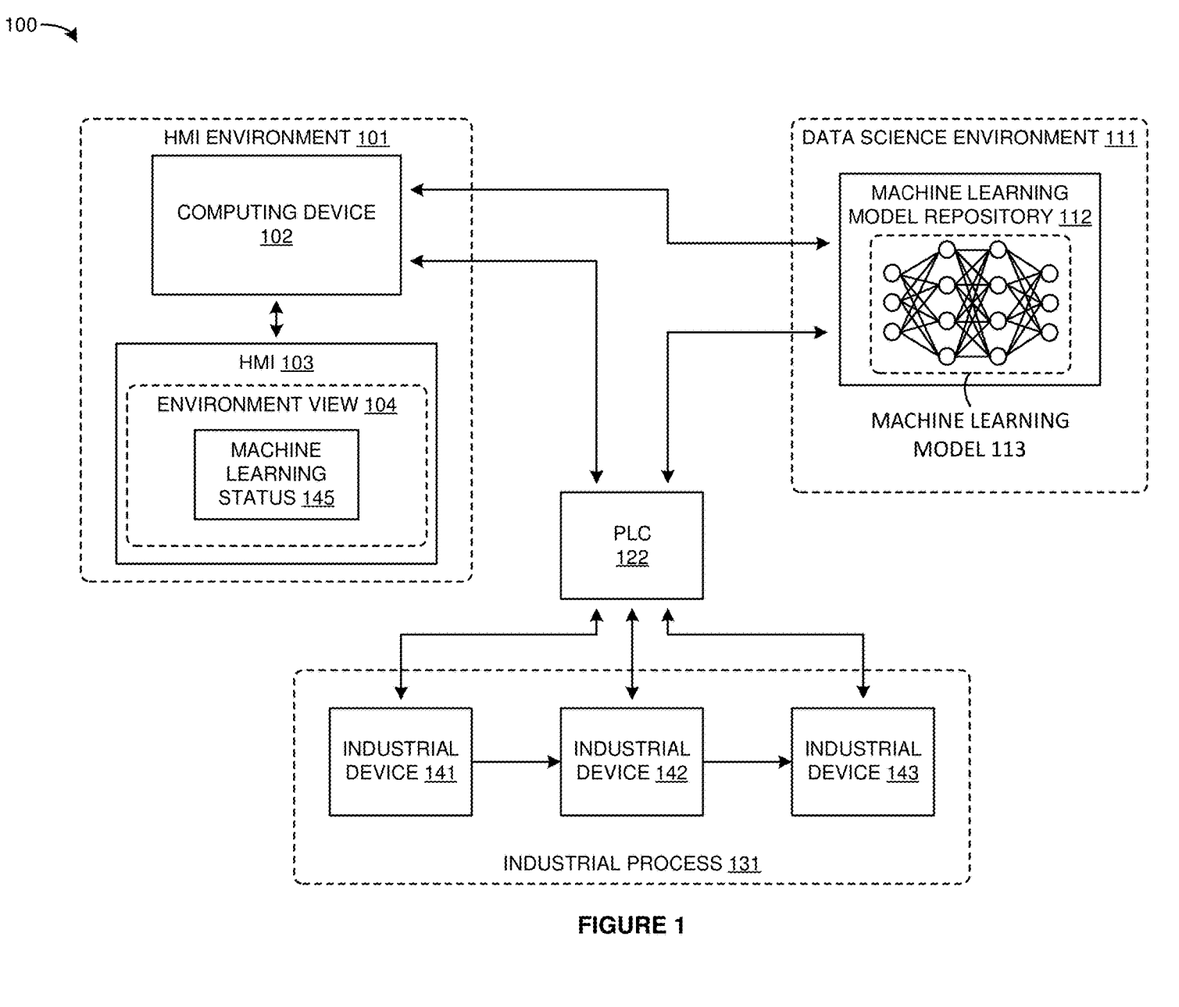
FIG. 1 illustrates an exemplary industrial automation environment to visualize machine learning operations.

Now referring to the Figures, FIG. 1 illustrates industrial automation environment 100 to visualize machine learning operations within industrial automation environment 100. Industrial automation environment 100 performs services like factory automation, factory control, machine control, smart manufacturing, machine communication and organization, and the like. Industrial automation environment 100 comprises Human Machine Interface (HMI) environment 101, data science environment 111, Programmable Logic Controller (PLC) 121, industrial process 131, and industrial devices 141-143. HMI environment 101 comprises computing device 102 and HMI 103. HMI 103 displays environment view 104 which comprise machine learning status 105. Data science environment 111 is representative of a data processing system and comprises machine learning model repository 112. Repository 112 is configured to host machine learning model 113. Industrials devices 141-143 are representative of a set machinery configured to implement industrial process 131.

HMI environment 101 is representative of an HMI system that allows human operators to view the operations of industrial automation environment 100. Computing device 102 comprises one or more computing apparatuses configured to host an application(s) to visualize the operations of, and receive user inputs for, industrial automation environment 100 on HMI 103, including the operations of machine learning model 113. It should be appreciated that the specific number of applications/modules hosted by computing device 102 is not limited. Computing device 102 may comprise one or more server computers, mobile computing devices, personal computers, tablet computers, and the like. Computing device 102 is operatively coupled to HMI 103. HMI 103 comprises one or more user interface components like displays, keyboards, touchscreens, tablet devices, and the like. The user interface components display environment view 104. Environment view 104 comprises a Guided User Interface (GUI) that allows a user to interact with the application(s) hosted by computing device 102, including the environment visualizations applications to view the operations of machine learning model 113.

Computing device 102 is coupled to data science environment 111. For example, the HMI applications hosted by computing device 102 may communicate with machine learning model repository 112. Machine learning model repository 112 hosts machine learning model 113 and is operatively coupled to PLC 121. Machine learning model 113 is representative of any machine learning model implemented within industrial automation environment 100 as described herein. Machine learning model 113 is configured to ingest process inputs from PLC 121. The process inputs may comprise feature vectors characterizing the operations of industrial devices 141-143. Machine learning model 113 generates and transfers machine outputs to PLC 121. The machine learning outputs influence the operations of industrial devices 141-143 to affect industrial process 131. For example, PLC 121 may receive and execute a machine learning output generated by model 113 and responsively transfer control signaling to industrial device 141 to lower the operating temperature of device 141. In some examples, repository 112 and PLC 121 comprise a single computing apparatus configured to control devices 141-143 and host model 113. For example, PLC 121 may host model 113 and comprise Application Specific Integrated Circuits (ASICs) or Field Programmable Gate Arrays (FPGAs) configured to implement machine learning functions (e.g., feature extraction and model hosting).

Computing device 102 is communicatively coupled to PLC 121. PLC 121 comprises one or more computing devices configured to receive and execute control code to generate control signaling for industrial devices 141-143. PLC 121 controls the automated and coordinated operation of industrial process 131. PLC 121 may implement control code that may be designed using any number of programming tools in an integrated design environment such as text-based coding, functional block diagrams, ladder logic, graphics-based programming, or other types of programming interfaces. The control code may be designed or programmed on a design computer running the integrated design environment, then transmitted or uploaded to PLC 121. Alternatively, the control code may be implemented with a system of hardware connections in the PLC or in programmable PLC modules by which a PLC can be upgraded to add more control capacity as its industrial automation process grows in sophistication.

PLC 121 controls industrial devices 141-143 by sending the control signaling over one or more data channels that support synchronous or asynchronous to implement industrial process 131. Industrial process 131 may comprises a process for manufacturing goods but may also comprise processes occurring within a utility plant (e.g., an electrical power plant), research or laboratory facility (e.g., a sample testing or processing facility), processes occurring within a food processing facility (e.g., a cattle processing plant), or any other suitable industrial automated environment. Industrial devices 141-143 comprise factory or industrial machinery or manufacturing equipment such as conveyor belts or other conveyance mechanisms, robotic devices or other automated or programmable devices, packaging devices including boxing, capping, and sealing equipment, processing equipment, mixers, filling stations, quality control equipment, and other devices associated with manufacturing or other industrial processes.

Industrial devices 141-143 are coupled to PLC 121. Industrial devices 141-143 receive control signaling from PLC 121 and operate in response to the control signaling to implement industrial process 131. The control signaling drives actuators in industrial devices 141-143 that dictate the operations of industrial devices 141-143. For example, the control signaling may correspond to an actuator setting that sets a motor speed in industrial device 141 to a desired value. As industrial devices 141-143 operate in response to the control signaling, they generate process data which characterizes their operations. Industrial devices 141-143 transfer the process data that they generate to PLC 121. PLC 121 feeds the process data to repository 112 to receive machine learning feedback to augment the operations of industrial devices 121.

As stated above, HMI 103 displays environment view 104. PLC 121 and repository 113 transfer operational data to computing device 102 characterizing the operations of model 113 and devices 141-143. Computing device 102 uses the operational data to generate environment view 104 for display on HMI 103. For example, the operational data may comprise metadata for machine learning outputs generated by model 113 and computing device 102 may generate environment view 104 to present the metadata. Environment view 104 comprises machine learning status 105. Machine learning status 105 comprises one or more visual indicators that depict the operation of machine learning model 113. The visual indicators may comprise metrics like machine learning output accuracy, machine learning decision context, relationships between model 113 and other devices in industrial automation environment 100, and/or other types of metrics for model 113. The visual indicators may utilize text, illustration, animations, and the like. A human operator may assess the state of model 113 using machine learning status 105. In some examples, a human operator may interact with HMI 103 to control model 113. For example, machine learning status 105 may indicate the prediction accuracy of machine learning model 113 is low, and responsively transfer a command to take model 113 offline using HMI 103.

HMI environment 101, data science environment 111, PLC 121, and industrial process 131 communicate over various communication links using communication technologies like industrial ethernet, Institute of Electrical and Electronic Engineers (IEEE) 702.3 (ENET), IEEE 702.11 (WIFI), Bluetooth, Time Division Multiplex (TDM), Data Over Cable System Interface Specification (DOCSIS), Internet Protocol (IP), General Packet Radio Service Transfer Protocol (GTP), and/or some other type of wireline and/or wireless networking protocol. The communication links comprise metallic links, glass fibers, radio channels, or some other communication media. The links use ENET, WIFI, virtual switching, inter-processor communication, bus interfaces, and/or some other data communication protocols.

Computing device 102, HMI 103, machine learning model repository 112, PLC 121, and industrial devices 141-143 comprise microprocessors, software, memories, transceivers, bus circuitry, and the like. The microprocessors comprise Central Processing Units (CPUs), Graphical Processing Units (GPUs), ASICs, FPGAs, and/or the like. The memories comprise Random Access Memory (RAM), flash circuitry, Solid State Drives (SSDs), Non-Volatile Memory Express (NVMe) SSDs, Hard Disk Drives (HDDs), and/or the like. The memories store software like operating systems, user applications, radio applications, and network functions. The microprocessors retrieve the software from the memories and execute the software to drive the operation of industrial automation environment 100 as described herein.

Figure 2:
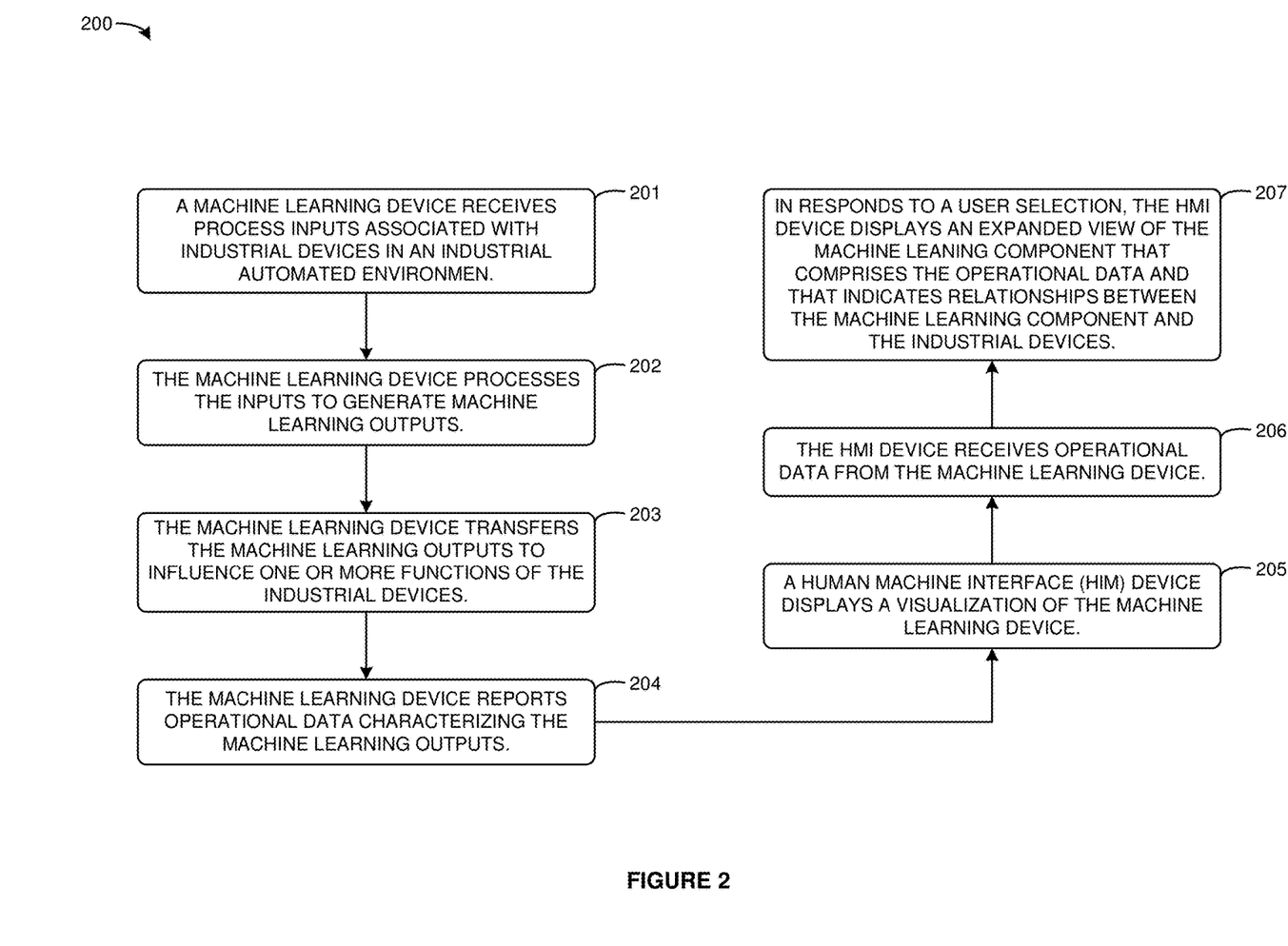
FIG. 2 illustrates an exemplary operation of an industrial automation environment to visualize machine learning operations.

In some examples, industrial automation environment 100 implements process 200 illustrated in FIG. 2. It should be appreciated that the structure and operation of industrial automation environment 100 may differ in other examples.

FIG. 2 illustrates process 200. Process 200 comprises a machine learning model status visualization process. Program 200 may be implemented in program instructions in the context of any of the software applications, module components, or other such elements of one or more computing devices. The program instructions direct the computing device(s) to operate as follows.

In operation, a machine learning device receives process inputs associated with industrial devices in an industrial automation environment (201). The machine learning device process the inputs to generate machine learning outputs (202). The machine learning device transfers the machine learning outputs to influence one or more functions of the industrial devices (203). The machine learning device reports operational data charactering the machine learning outputs (204). A Human Machine Interface (HMI) device displays a visualization of the machine learning device (205). The HMI device receives operational data from the machine learning device (206). In response to a user selection, the HMI device displays an expanded view of the machine learning device that comprises the operational data and that indicates relationships between the machine learning component and the industrial devices (207).

Referring back to FIG. 1, industrial automation environment 100 includes a brief example of process 200 as employed by one or more applications hosted in HMI environment 101, data science environment 111, PLC 121, and industrial devices 141-143. In operation, PLC 121 receive and execute control code to implement industrial process 131. In response to the execution, PLC 121 generates and transfers control signaling to industrial devices 141-143 to implement industrial process 131. For example, PLC 121 may receive control code that dictates speed settings for industrial devices 141-143. PLC 121 may execute the control code to generate corresponding control signaling and may transfer the control signaling to actuators in industrial devices 141-143 to achieve desired speed setting.

Industrial devices 141-143 receive the control signaling and operate accordingly. For example, the control signaling may dictate motor speeds, temperature levels, unit quantities, and/or other types of operating metrics. As industrial devices 141-143 operate, they generate operational data that characterizes their operations. The operational data may comprise data like rotations per minute over time, units produced over time, average operating temperature or pressure, and the like. Industrial devices 141-143 report their data to PLC 121.

PLC 121 receives the operational data and responsively transfers the operational data to machine learning repository 113 to receive machine learning feedback. PLC 121 may pre-process the operational data so that it is suitable for machine learning ingestion (e.g., feature extraction). Alternatively, PLC 121 may transfer the operational data to repository 112 and repository 112 may configure the operational data for machine learning ingestion. Machine learning model 113 ingests machine learning inputs representing the operational data generated by industrial devices 141-143 (step 201). Machine learning model 113 processes the to the machine learning inputs using its constituent machine learning algorithms to generate machine learning outputs (step 202). The machine learning outputs may be configured to optimize the operations of industrial devices 141-143 based on the input data fed to machine learning output 113. The machine learning outputs may comprise predictions and correctional signaling for industrial devices 141-143. For example, the predictions may indicate that if industrial device 141 continues operating at its current pressure it will run out of process inputs, and the correctional signaling may comprise machine instructions that drive industrial device to reduce its operating temperature.

Machine learning model repository 112 transfers the machine learning outputs generated by model 113 to PLC 121 (step 203). PLC 121 receives the machine learning outputs and generates corresponding control signaling to implement the outputs. The machine learning based control signaling may keep industrial devices within preferred operating ranges by autonomously manipulating Proportional Integral Derivative (PID) control values of Industrial devices 141-143, however the specific type of control scheme is not limited and may depend on the specific type of industrial device and/or industrial process being implemented.

Machine learning model repository 113 reports operational data characterizing the machine learning outputs to computing device 102 (step 204). The operational data may indicate operating relationships between model 113 and devices 141-143, prediction accuracy of the machine learning outputs, context that explains why a prediction was made, control program utilization, and/or other types of operational metrics. Computing device 102 displays a visualization of machine learning model 113 via HMI 103 (step 205) and receives the operational data (step 206). The presentation of the machine learning model on HMI 103 allows plant operators to assess the operations of machine learning model 113. In response to a user selection, HMI 103 displays an expanded view of machine learning model 113 (step 206). The expanded view comprises the operational data and indicates operational relationships between model 113, PLC 121, and devices 141-143. The expanded view may illustrate the connections between model 113 and devices 141-143, prediction accuracy of the machine learning outputs, context that explains why a prediction was made, control program utilization, and/or other types of operational metrics indicated by the operational data received from model repository 112. Advantageously, industrial automation environment 100 effectively and efficiently visualizes the status and health of machine learning model 113 using HMI environment 101

Figure 3:
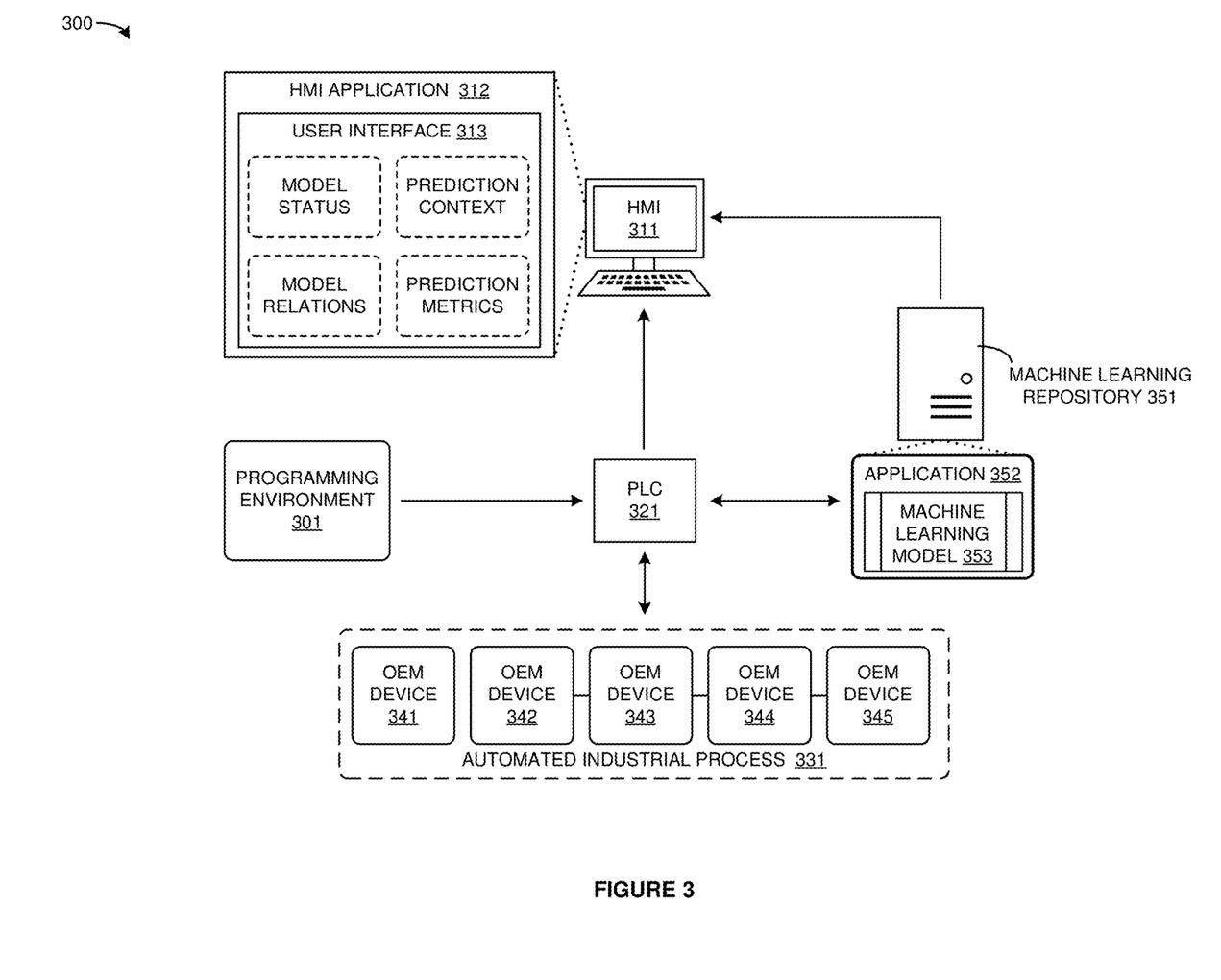
FIG. 3 illustrates an exemplary industrial automation environment to visualize machine learning operations.

FIG. 3 illustrates an industrial automation environment 300 to visualize machine learning model status. Industrial automation environment 300 comprises an example of industrial automation environment 100, however environment 100 may differ. Industrial automation environment 300 comprises programming environment 301, Human Machine Interface (HMI) 311, Programmable Logic Controller (PLC) 321, industrial process 331, Original Equipment Manufacturer (OEM) devices 341-345, and machine learning repository 351. HMI 311 comprises HMI application 312 and user interface 313. Machine learning repository 351 hosts applications 352 to implement machine learning model 353. OEM devices 341-345 are representative of various industrial components connected in series configured to implement industrial process 331.

Programming environment 301 is representative of one or more computing devices integrated into a network configured to generate control instructions for industrial automation environment 300. The one or more computing devices comprise processors, bus circuitry, storage devices, software, and the like. The processors may comprise CPUs, GPUs, ASICs, FPGAs, and the like. The storage devices comprise flash drives, RAM, HDDs, SSDs, NVMe SSDs, and the like. The storage devices store the software. The processors may retrieve and execute software stored on the storage devices to drive the operation of programming environment 301. Programming environment 301 may host one or more design applications configured to generate control instructions in response to user inputs. The control instructions may comprise visual code blocks, ladder logic, code chunks, functional block diagrams, machine learning optimizations, and/or other types of industrial control instructions.

HMI 311 is representative of one or more computing devices configured to illustrate the operating conditions of industrial automation environment 301. The one or more computing devices comprise processors, bus circuitry, storage devices, software, and the like. The processors may comprise CPUs, GPUs, ASICs, FPGAs, and the like. The storage devices comprise flash drives, RAM, HDDs, SSDs, NVMe SSDs, and the like. The storage devices store the software. The processors may retrieve and execute software stored on the storage devices to drive the operation of HMI 311. Although HMI 301 is illustrated as a personal computing device, HMI 301 may comprise a server computer, a mobile device, a kiosk, a touchscreen device, a faceplate, or some other type of computing device capable of performing the functions described herein.

HMI 311 hosts HMI application 312. HMI 311 comprises user interface components like displays, touchscreens, keyboards, and the like that allow a user to interact with application 312. HMI 312 comprises user interface 313 to visualize the operation of machine learning model 353. User interface 313 is illustrated comprising windows for model status, prediction context, model relations, and prediction metrics. The model status window may comprise information indicating whether the model is operational. The model relations window may comprise information indicating other devices the model interacts with. The prediction context window may comprise information indicating why a machine learning prediction was made. The prediction metrics window may comprise information indicating how accurate the model's predictions have been. In other examples, user interface 313 may comprise additional windows that comprise information indicating other aspects of the machine learning model. User interface 313 may utilize illustrations, text, animations, or other types of visual indicators to characterize machine learning model 353.

PLC 321 is representative of an industrial controller configured to execute control programs generated by programming environment 301 to implement industrial processes 331. PLC 321 comprises one or more computing devices. The one or more computing devices of PLC 321 comprise processors, bus circuitry, storage devices, software, and the like. The processors may comprise CPUs, GPUs, ASICs, FPGAs, and the like. The storage devices comprise flash drives, RAM, HDDs, SSDs, NVMe SSDs, and the like. The storage devices store the software. The processors may retrieve and execute software stored on the storage devices to drive the operation of PLC 321. In some examples, the computing devices of PLC 321 are configured to host and implement machine learning models to assist in implementing and controlling industrial process 331.

PLC 321 is coupled to programming environment 301, HMI 311, repository 351, and to OEM devices 341-345. PLCs 321 receives and executes control programs from programming environment 301 to control the operation of OEM devices 341-345. The control program may comprise ladder logic, program tags, or other types of industrial control code that provide instructions for PLC 321 to control the operations of OEM devices 341-345. For example, PLC 321 may receive a control program and identify which tags of the control correspond to the ones of OEM devices 341-345.

Industrial process 331 is representative of various industrial processes that operate according to control code generated in programming environment 301. The industrial processes may comprise a manufacturing process, chemical production process, food processing process, or any other type of automated industrial process. Although industrial processes 331 is depicted comprising five OEM devices, in other examples process 331 may comprise a different number of OEM devices.

OEM devices 341-345 may comprise devices like pumps, compressors, heat exchanges, centrifuges, mills, conveyers, filters, and the like. OEM devices 341-345 may comprise subcomponents (not illustrated for clarity) like motors, valves, actuators, electrical circuitry, processing circuitry, storage circuitry, transceivers, machined parts, and the like.

OEM devices 341-345 are coupled to PLC 321. PLCs 321 transfer control signaling generated in response to the executed program instructions to OEM devices 341-345. OEM devices 341-345 receive the control signaling and responsively operate accordingly. For example, OEM device 341 may comprise an electric motor to drive a pump. PLC 321 may execute the control instructions and determine a current level to power the electric motor at to achieve a desired pressure differential in the pump. PLC 321 may transfer control signaling to an actuator in the motor in OEM device 441. The actuator in the motor in OEM device 441 may receive the control signaling and apply the apply electric current to achieve the power level for the electric motor to drive the motor at the speed necessary to achieve the desired pressure differential.

As OEM devices 341-345 operate based on the control signaling, they generate OEM process data. The OEM data indicates the status of variables, operations, and/or processes of OEM devices 341-345. For example, OEM device 344 may comprise a conveyor belt and may generate OEM data that indicates a running average of its operating speed. OEM devices 341-345 report OEM process data to PLC 321. For example, OEM device 344 may comprise a furnace and may continuously report its temperature and pressure to PLC 321 as OEM data.

Machine learning repository 351 is representative of one or more computing devices integrated into a network that communicates with PLC 321 and HMI 311. Examples of repository 351 may include server computers and data storage devices deployed on-premises, in the cloud, in a hybrid cloud, or elsewhere, by service providers such as enterprises, organizations, individuals, and the like. For example, repository 351 may comprise a server computer deployed on a factor floor to provide machine learning services to OEM devices 341-345. Repository 352 may rely on the physical connections provided by one or more other network providers such as transit network providers, Internet backbone providers, and the like to communicate with PLCs 322. Alternatively, repository 351 may utilize local communication channels like industrial ethernet connections to interface with PLC 321. Repository 351 comprises processors, bus circuitry, storage devices, software, and the like. The processors may comprise CPUs, GPUs, ASICs, FPGAs, and the like. The storage devices comprise flash drives, RAM, HDDs, SSDs, NVMe SSDs, and the like. The storage devices store the software. The processors may retrieve and execute software stored on the storage devices to drive the operation of repository 351.

Repository 351 hosts application 352. Application 352 comprises a machine learning interface application configured to implement machine learning model 353. For example, application 352 may intake OEM process data generated by devices 341-345 and perform a feature extraction process to calculate derivative values for the OEM process data. Application 352 may generate feature vectors based on the derivative values to represent the OEM process data and feed the feature vectors to machine learning model 353 to generate machine learning feedback. In some examples, Application 352 may train machine learning model 353. For example, application 352 may utilize supervised learning methods, unsupervised learning methods, and/or reinforcement learning methods to train machine learning model 353. The training data may comprise feature vectors that comprise numeric representations of the training data. The feature vectors may comprise derivative values that represent performance metrics, variable ranges, and/or other training data.

Machine learning model 353 comprises one or more machine learning algorithms that are trained to perform generate machine learning feedback to optimize industrial process 331. Machine learning model 353 may employ one or more machine learning algorithms through which data can be analyzed to identify patterns, make decisions, make predictions, or similarly produce output that can inform control signaling sent to OEM devices 341-345. Examples of machine learning algorithms that may be employed solely or in conjunction with one another include artificial neural networks, nearest neighbor methods, ensemble random forests, support vector machines, naïve Bayes methods, linear regressions, or other types of machine learning algorithms that predict output data based on input data. Determining which machine learning methods to use may depend on the specific purpose or functions required in a particular industrial setting.

Figure 4:
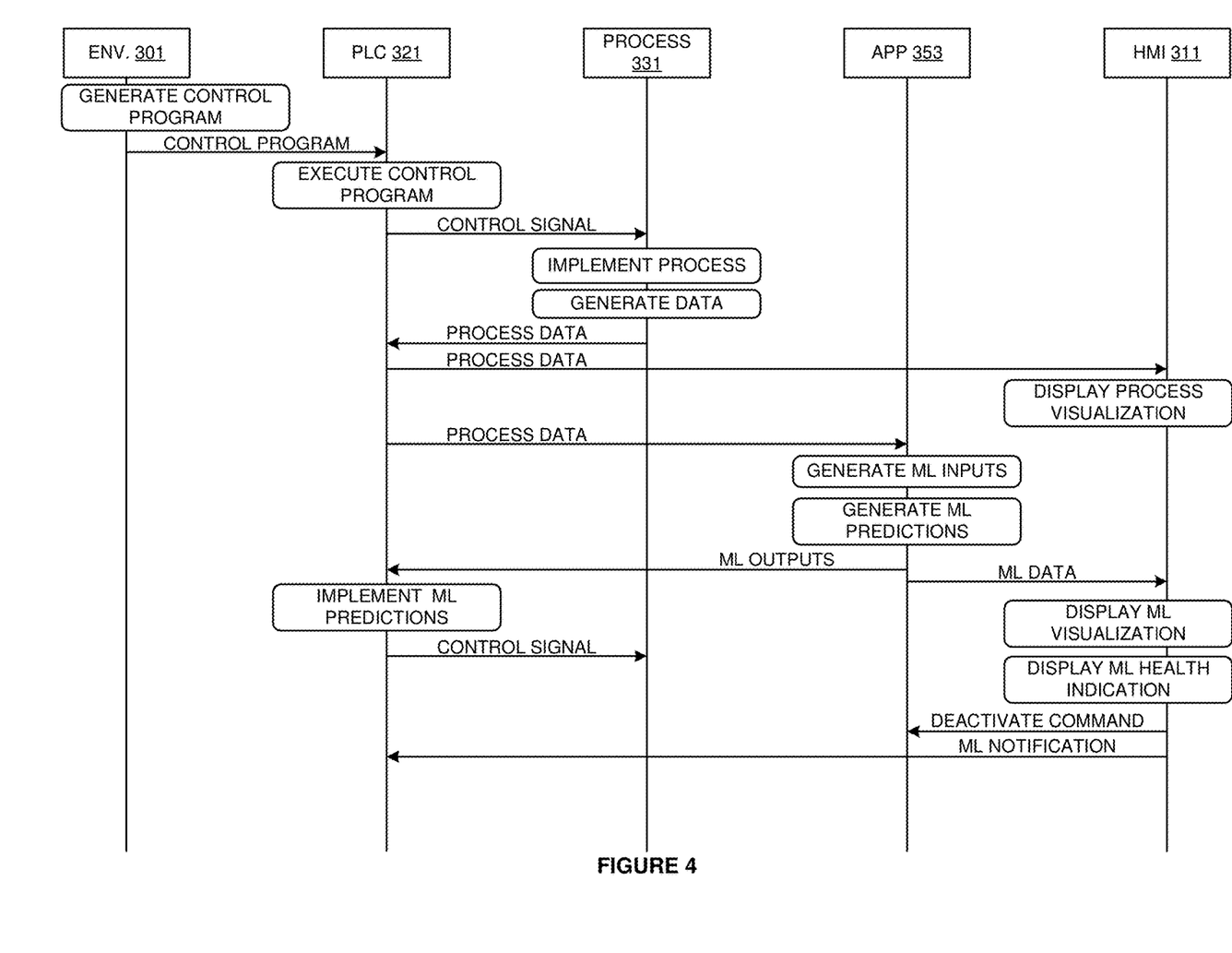
FIG. 4 illustrates an exemplary operation of an industrial automation environment to visualize machine learning operations.

FIG. 4 illustrates an exemplary operation of industrial automation environment 300 to visualize machine learning model status. The operation depicted by FIG. 4 comprises an example of process 200 illustrated in FIG. 2, however process 200 may differ. In other examples, the structure and operation of industrial automation environment 300 may be different.

In operation, programming environment (ENV.) 301 generates a control program comprising a set of program tags that form a ladder logic diagram. The program tags may comprise code chunks that, when executed by PLC 321, dictate the operation of industrial process 331. The program tags may comprise code that drives that start/stop of machine operations, reporting of variable metrics for a machine (e.g., temperature readouts), and/or other types of machine operations. For example, of the program tags may represent the viscosity of a substance in OEM device 341. Typically, programming environment 301 receives user input from an operator via a user interface which drives programming environment 301 to generate the control program. Upon completion of the control program, programming environment 301 transfers the control program to PLC 321. For example, transceiver circuitry in programming environment 301 may upload the control program to PLC 321 over an industrial ethernet link.

PLC 321 receives and executes the control program. PLC 321 responsively generates control signaling based on the control program. PLC 321 transfers the control signaling to OEM devices 341-345 to drive the operation of industrial process 331. For example, OEM device 345 may comprise a heat exchanger and the control program may dictate a temperature differential setting for OEM 345. PLC 321 may execute the control program and determine a valve setting to achieve a cold-water flow rate that results in the desired temperature differential. PLC 321 may transfer control signaling to an actuator in OEM device 345 to achieve the desired valve setting. The actuator in OEM device 345 may receive the control signaling and set the valve to the position indicated by the control program.

Returning to the operation, OEM devices 341-345 of industrial process 331 receive the control signaling from PLC 321. OEM devices 341-345 implement industrial process 331 as dictated by the control program. Each OEM device may comprise a different device class of OEM. For example, OEM device 341 may comprise a pump, OEM device 342 may comprise a heater, and OEM device 343 may comprise a reactor, however it should be appreciated that the device types of OEM devices 341-345 are not limited. As OEM devices 341-345 operate in response to the control signaling, they generate OEM process data that characterizes their operations. For example, if OEM device 342 comprises a motor, it may generate OEM data that indicates it power output over time. It should be appreciated that the OEM data produced by OEM devices 341-345 may depend on their device classes and the type of industrial process they implement.

OEM devices 341-345 transfer their OEM operational data to PLC 321. PLC 321 receives the OEM data and responsively transfers the OEM process data to HMI 311. HMI 311 displays a visualization of industrial process 331 on user interface 313 based on the OEM process data. The visualization indicates the device types, the operational relationships, the operational metrics, and/or other data characterizing OEM devices 341-345. A human operator may view HMI 311 to assess the operating state of OEM devices 341-345.

PLC 321 also transfers the process data to application (APP) 352 in machine learning repository 351. Application 352 implements an extraction process on the OEM process data to configure the process data for ingestion by machine learning model 353. Application 352 calculates derivative values for the OEM data and combines the derivative values into feature vectors to represent various features of the OEM data. For example, application 352 may construct a feature vector that represents average electrical input per day for OEM device 343. Application 352 transfers the feature vectors for the OEM data to machine learning model 353 as machine learning inputs.

Machine learning model 353 ingests and processes the machine learning inputs using its constituent machine learning algorithms and generates a machine learning output to control or otherwise influence the operation of OEM device 341-345. The machine learning outputs comprise machine learning predictions and corresponding control signaling readable by PLC 321. Application 352 transfers the machine learning outputs to PLC 321. PLC 321 implements the machine learning predictions generated by model 353 and responsively transfers the control signaling to one or more of OEM devices 341-345. For example, machine learning model 353 may receive OEM operational data generated by OEM device 341 and determine that OEM device 341 will fall out of a target operating range (e.g., operating pressure). Model 353 may then output a prediction that device 341 will fall out of the target range as well as control signaling to drive the actuators of OEM device 341 to prevent OEM device 341 from falling out of the target operating range. PLC 321 may then transfer the machine learning generated control signaling to the actuators of OEM device 341.

Application 352 transfers machine learning operational data to HMI 311. The machine learning data characterizing the operations of machine learning model 353. For example, the machine learning data may comprise the machine learning prediction, contextual information for the predictions (e.g., why a prediction was made), machine learning control signaling, accuracy metrics for the predictions, and/or other data that indicates the operations of model 353.

HMI 311 receives the machine learning data and displays a visualization of machine learning model 353 on user interface 313. The visualization indicates the model type, the operational relationships, the machine learning data, the machine learning predictions, contextual information for the predictions (e.g., why a prediction was made), machine learning control signaling, accuracy metrics for the predictions, and/or other data characterizing machine learning model 353. A human operator may view HMI 311 to assess the operating state of machine learning model 353. In this example, HMI 311 receives a user input displays an expanded view of machine learning model 353. The expanded view may comprise additional contextual information for the machine learning predictions like r-squared values for model 353. The human operator views the expanded view and determines the prediction accuracy metrics of machine learning model 353 is below a threshold value. In response, HMI 311 receives a user input that directs HMI 311 to take machine learning model 353 offline.

In response to the user input, HMI 311 transfers a deactivation command to application 352 to disable machine learning model 353. Application 353 receives the command and responsively deactivates model 353. HMI 311 also transfers a machine learning notification to PLC 321. PLC 321 receives the notification and stops implementing machine learning predictions and corresponding control signaling generated by model 353. In other examples, a human operator may instead view the health of machine learning model 353 via HMI 311 and determine that model 353 is in a suitable operating state and model 353 may remain in an active state.

Figure 5:
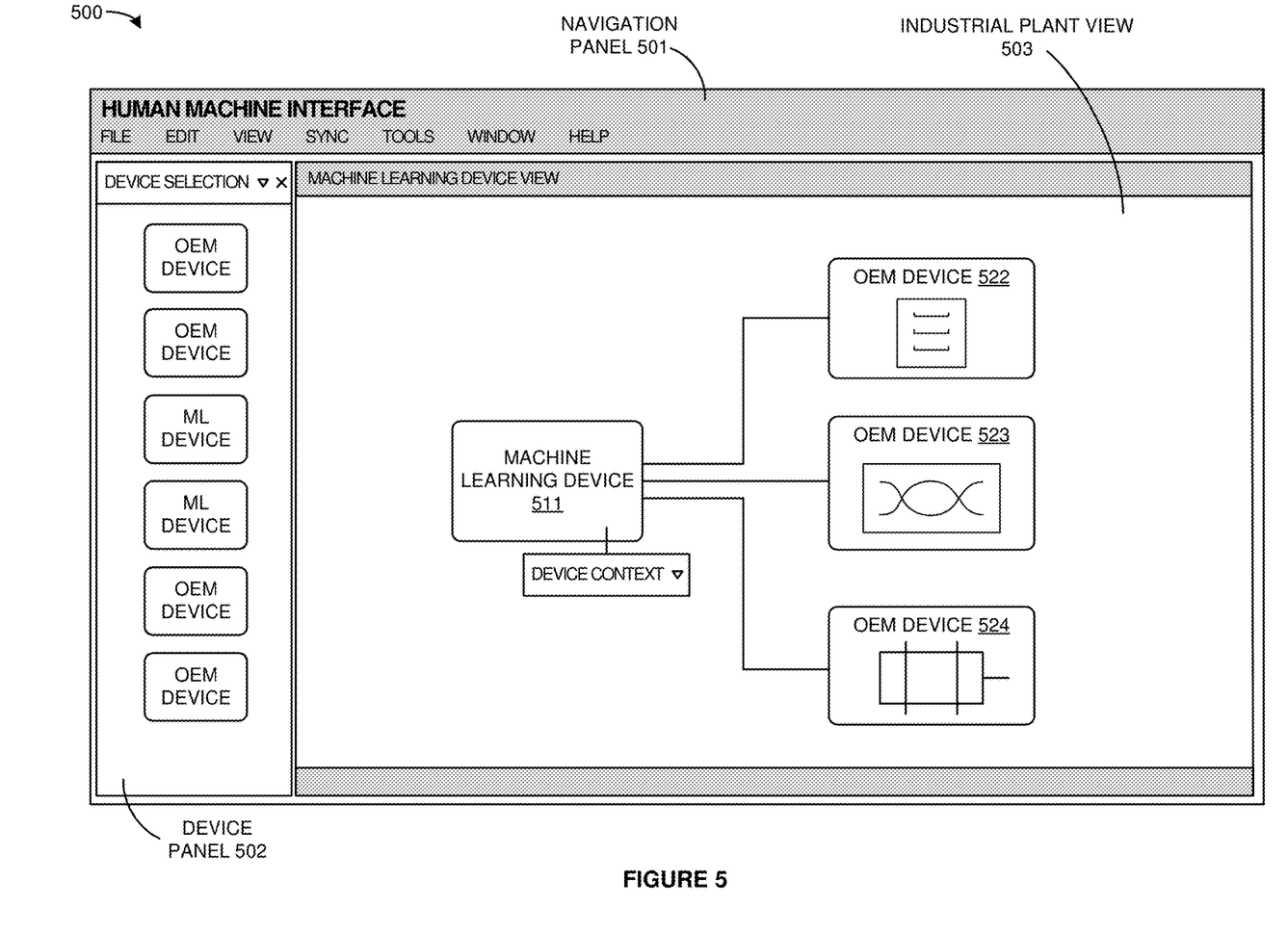
FIG. 5 illustrates an exemplary user interface in an industrial automation environment.

FIG. 5 illustrates user interface 500 to visualize the state of a machine learning model in an industrial automation environment. User interface 500 comprises an example of HMI 103 and user interface 313, however HMI 103 and user interface 313 may differ. User interface 500 comprises an HMI of an automated industrial environment presented on a display screen which is representative of any user interface for visualizing an automated industrial environment. For example, user interface 501 may comprise a Guided User Interface (GUI) configured to allow a user to assess the health of a machine learning model (e.g., model 353).

User interface 500 includes navigation panel 501 that allows a user to access the various features available through user interface. Navigation panel 501 comprises tabs like "FILE", "EDIT", "VIEW", "LIBRARY MANAGEMENT", "TOOLS", "WINDOW", and "HELP". In other examples, navigation panel 501 may comprise fewer tabs, more tabs, and/or different types of tabs. A user may select a tab to access the functionality of the tab. Upon selection, the tabs may open drop down menus that list their functionality. For example, a user may select the "FILE" tab and select an option from a drop-down menu to access additional functionality. Navigation panel 501 is located on a top portion of user interface 500 however navigation panel 501 may be located on a different portion of user interface 500. For example, navigation panel 501 may be located on the bottom portion of user interface 500.

User interface 500 incudes device panel 502. Device panel 502 comprises a device selection system that allows a user to select and view operating aspects of OEM devices and machine learning devices. In this example, the device selection panel displays a view of four OEM devices and two machine learning devices, however, the device selection panel may display a different number of devices and/or different types of devices. Typically, device panel 502 will display OEM devices and machine learning devices that the HMI is operationally coupled to. Device panel 502 is presented on a left portion of user interface 500, however device panel 502 may be presented on a different location of user interface 500.

User interface 500 includes industrial plant view 503. Industrial plant view 503 comprises a visualization of an industrial automation environment that indicates the OEM devices, machine learning models, and operation relationships between the models and OEM devices. In this example, industrial plant view 503 comprises machine learning device 511 and OEM devices 522-524. Industrial plant view 503 indicates the connections between machine learning device 511 and OEM devices 522-524. For example, the connections may indicate that machine learning device 511 provides machine learning outputs to influence the operation of OEM devices 522-524 within the automated industrial environment. OEM devices 522-524 may comprise text and illustrations that indicate the device types of the OEM devices. Machine learning device 511 comprises a device context window that upon selection, allows a user to view additional information for machine learning device 511. For example, a user may select machine learning device 511 using device selection window 502. The user selection may prompt user interface 500 to increase the center machine learning device 511 on industrial plant view 503 and present the device connect window.

Figure 6:
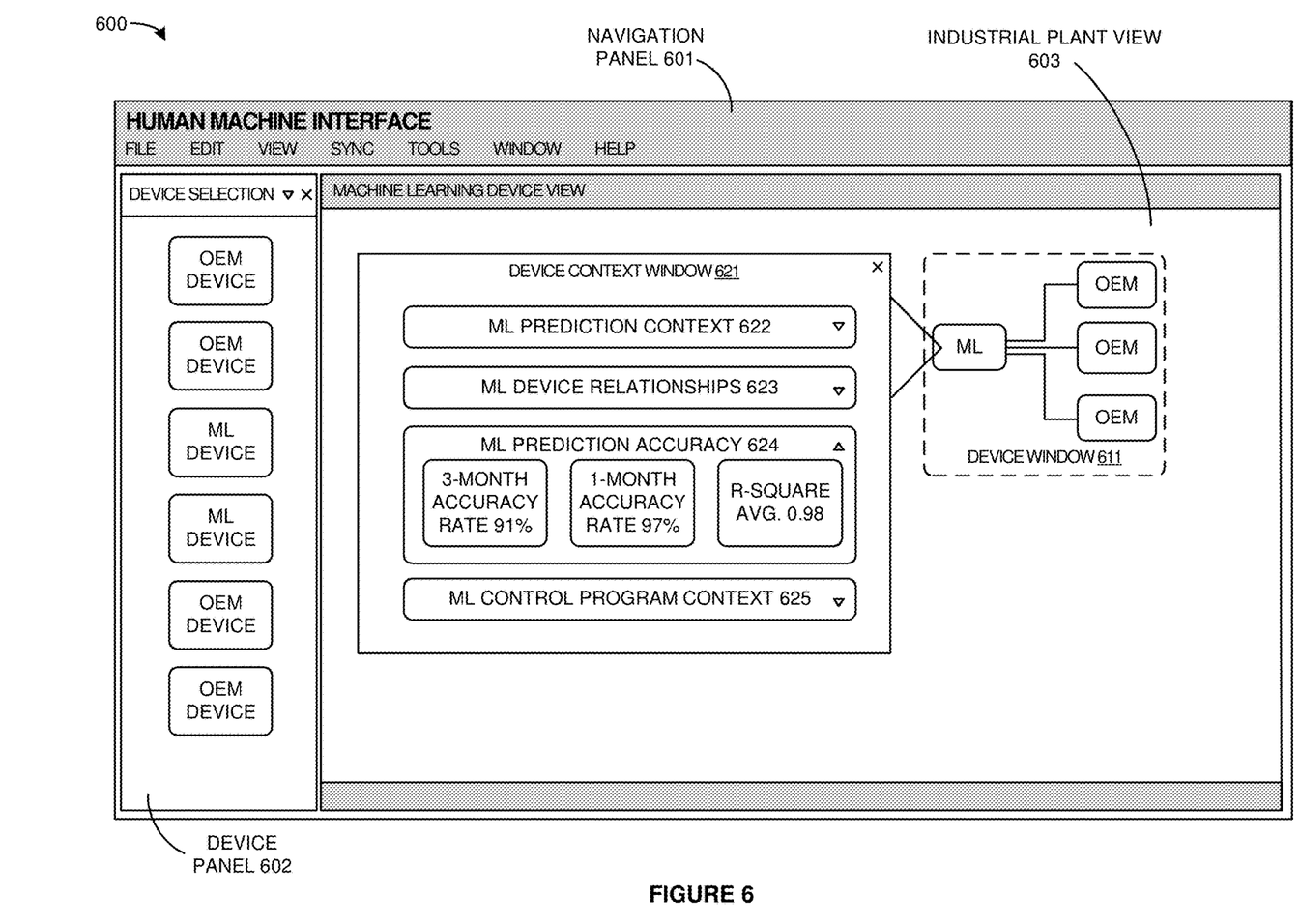
FIG. 6 illustrates an exemplary user interface in an industrial automation environment.

FIG. 6 illustrates user interface 600 to visualize the state of a machine learning model in an industrial automation environment. User interface 600 comprises an example of HMI 103 and user interface 313, however HMI 103 and user interface 313 may differ. User interface 600 comprises an HMI of an automated industrial environment presented on a display screen which is representative of any user interface for visualizing an automated industrial environment. For example, user interface 601 may comprise a GUI configured to allow a user to assess the health of a machine learning model (e.g., model 353).

User interface 600 includes navigation panel 601 that allows a user to access the various features available through user interface. Navigation panel 601 comprises tabs like "FILE", "EDIT", "VIEW", "LIBRARY MANAGEMENT", "TOOLS", "WINDOW", and "HELP". In other examples, navigation panel 601 may comprise fewer tabs, more tabs, and/or different types of tabs. A user may select a tab to access the functionality of the tab. Upon selection, the tabs may open drop down menus that list their functionality. For example, a user may select the "FILE" tab and select an option from a drop-down menu to access additional functionality. Navigation panel 601 is located on a top portion of user interface 600 however navigation panel 601 may be located on a different portion of user interface 600. For example, navigation panel 601 may be located on the bottom portion of user interface 600.

User interface 600 incudes device panel 602. Device panel 602 comprises a device selection system that allows a user to select and view operating aspects of OEM devices and machine learning devices. In this example, the device selection panel displays a view of four OEM devices and two machine learning devices, however, the device selection panel may display a different number of devices and/or different types of devices. Typically, device panel 602 will display OEM devices and machine learning devices that the HMI is operationally coupled to. Device panel 602 is presented on a left portion of user interface 500, however device panel 602 may be presented on a different location of user interface 500.

User interface 600 includes industrial plant view 603. Industrial plant view 603 comprises a visualization of an industrial automation environment that indicates the OEM devices, machine learning models, and operation relationships between the models and OEM devices. In this example, industrial plant view device window 611 and device context window 621. For example, a user may have selected a device context option (e.g., the device context option illustrated in FIG. 5) associated with a machine learning device in device window 611, and the user selection may drive user interface 600 to display device context window 621 in industrial plant view 603.

Device context window 621 comprises an expanded view of a machine learning device that presents various operational metrics of the machine learning device. In doing so, a plant operator may view the status of a machine learning asset on the factory floor. Device context window 621 comprise machine learning prediction context 622, machine learning device relationships 623, machine learning prediction accuracy 624, and machine learning program context 625. Windows 622-625 of device context window 621 comprise drop down options that allow a user to select and view the contents of the window. In this example, a user selected the drop-down option for machine learning prediction accuracy 624. Machine learning prediction accuracy 624 indicates a 3-month prediction accuracy rate, a 1-month prediction accuracy rate, and an r-squared prediction value for a machine learning device. It should be appreciated that these prediction accuracy metrics are exemplary, and that other metrics may be used in other examples.

Figure 7:
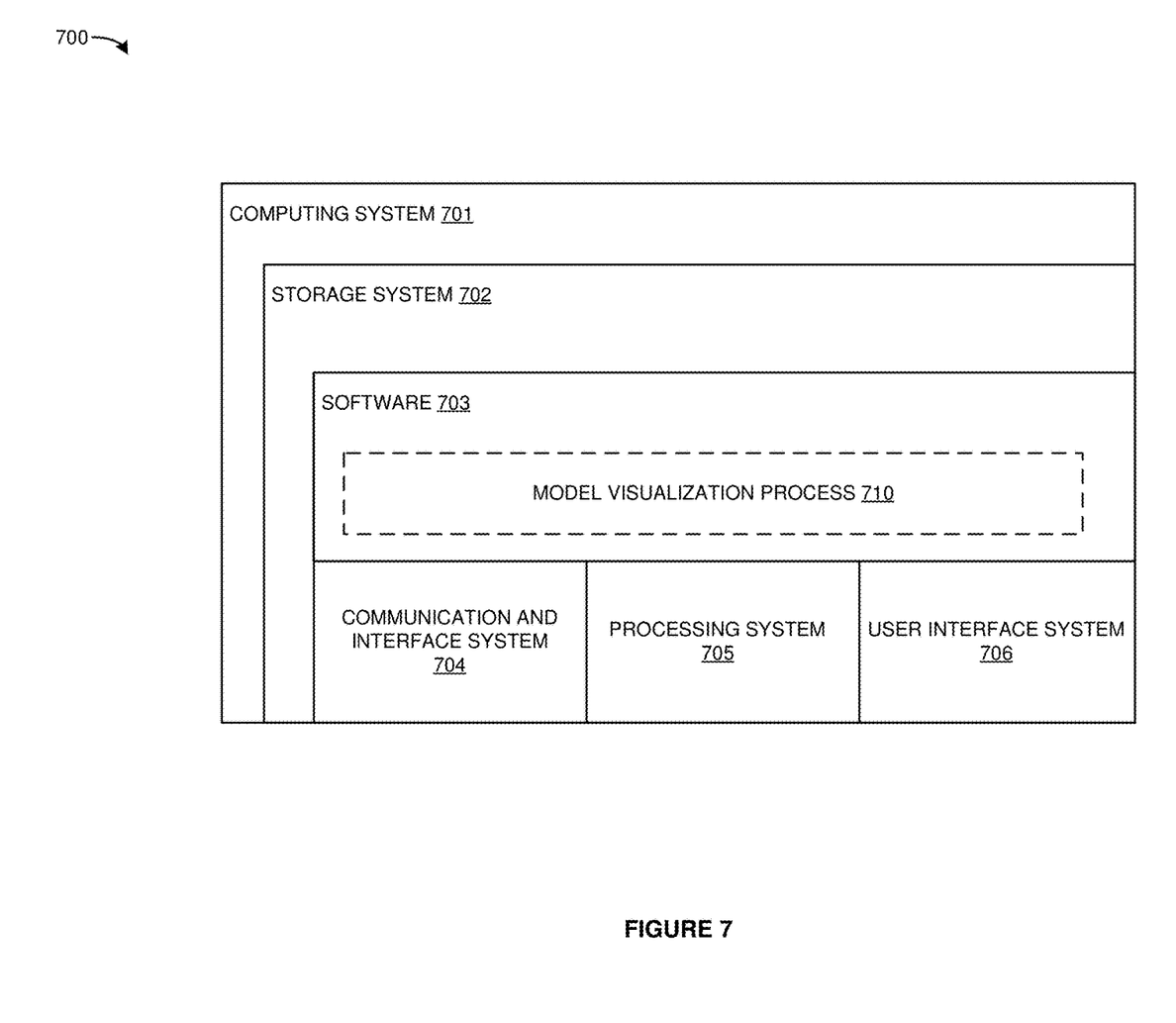
FIG. 7 illustrates an exemplary computing device that may be used in accordance with some embodiments of the present technology.

FIG. 7 illustrates computing system 701 to visualize machine learning model status on a Human Machine Interface (HMI) in an industrial automation environment according to an implementation of the present technology. Computing system 701 is representative of any system or collection of systems with which the various operational architectures, processes, scenarios, and sequences disclosed herein for visualizing machine learning operations within industrial automation environments may be employed. For example, computing system 701 may be representative of computing device 102, machine learning model repository 112, PLC 121, HMI 311, PLC 321, repository 351, and/or any other computing device contemplated herein. Computing system 701 may be implemented as a single apparatus, system, or device or may be implemented in a distributed manner as multiple apparatuses, systems, or devices. Computing system 701 includes, but is not limited to, storage system 702, software 703, communication interface system 704, processing system 705, and user interface system 706. Processing system 705 is operatively coupled with storage system 702, communication interface system 704, and user interface system 706.

Processing system 705 loads and executes software 703 from storage system 702. Software 703 includes and implements model visualization process 710, which is representative of any of the machine learning visualization processes discussed with respect to the preceding Figures, including but not limited to the industrial control, machine learning visualization, and HMI operations described with respect to the preceding Figures. For example, model visualization process 710 may be representative of process 200 illustrated in FIG. 2 and/or the exemplary operation of environment 300 illustrated in FIG. 4. When executed by processing system 705 to visualize a machine learning model, software 703 directs processing system 705 to operate as described herein for at least the various processes, operational scenarios, and sequences discussed in the foregoing implementations. Computing system 701 may optionally include additional devices, features, or functionality not discussed for purposes of brevity.

Processing system 705 may comprise a micro-processor and other circuitry that retrieves and executes software 703 from storage system 702. Processing system 705 may be implemented within a single processing device but may also be distributed across multiple processing devices or subsystems that cooperate in executing program instructions. Examples of processing system 705 include general purpose central processing units, graphical processing units, application specific processors, and logic devices, as well as any other type of processing device, combinations, or variations thereof.

Storage system 702 may comprise any computer readable storage media readable by processing system 705 and capable of storing software 703. Storage system 702 may include volatile, nonvolatile, removable, and/or non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 702 may also include computer readable communication media over which at least some of software 703 may be communicated internally or externally. Storage system 702 may be implemented as a single storage device but may also be implemented across multiple storage devices or sub-systems co-located or distributed relative to each other. Storage system 702 may comprise additional elements, such as a controller, capable of communicating with processing system 705 or possibly other systems.

Software 703 (including model visualization process 710) may be implemented in program instructions and among other functions may, when executed by processing system 705, direct processing system 705 to operate as described with respect to the various operational scenarios, sequences, and processes illustrated herein. For example, software 703 may include program instructions for presenting an expanded view of a machine learning model on an HMI that indicates the health of the model as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 703 may include additional processes, programs, or components, such as operating system software, virtualization software, or other application software. Software 703 may also comprise firmware or some other form of machine-readable processing instructions executable by processing system 705.

In general, software 703 may, when loaded into processing system 705 and executed, transform a suitable apparatus, system, or device (of which computing system 701 is representative) overall from a general-purpose computing system into a special-purpose computing system customized to aggregate machine learning operational data and display the health status of a machine learning model as described herein. Indeed, encoding software 703 on storage system 702 may transform the physical structure of storage system 702. The specific transformation of the physical structure may depend on various factors in different implementations of this description. Examples of such factors may include, but are not limited to, the technology used to implement the storage media of storage system 702 and whether the computer-storage media are characterized as primary or secondary storage, as well as other factors.

For example, if the computer readable storage media are implemented as semiconductor-based memory, software 703 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 704 may include communication connections and devices that allow for communication with other computing systems (not shown) over communication networks (not shown). Examples of connections and devices that together allow for inter-system communication may include network interface cards, antennas, power amplifiers, radiofrequency circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 701 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of networks, or variation thereof. The aforementioned communication networks and protocols are well known and an extended discussion of them is omitted for the sake of brevity.

While some examples provided herein are described in the context of computing devices for machine learning model visualization, it should be understood that the condition systems and methods described herein are not limited to such embodiments and may apply to a variety of other extension implementation environments and their associated systems. As will be appreciated by one skilled in the art, aspects of the present invention may be embodied as a system, method, computer program product, and other configurable systems. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number, respectively. The word "or" in reference to a list of two or more items, covers all of the following interpretations of the word: any of the items in the list, all of the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for" but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A system to visualize machine learning model status in an industrial automation environment, the system comprising:
  a memory that stores executable components; and
  a processor, operatively coupled to the memory, that executes the executable components, the executable components comprising:
  a machine learning component configured to receive process inputs associated with industrial devices in the industrial automated environment, process the inputs to generate machine learning outputs that comprise control signaling to influence one or more functions of the industrial devices, transfer the control signaling to a Programmable Logic Controller (PLC), and report operational data characterizing the machine learning outputs and the control signaling, wherein the PLC influences one or more functions of the industrial devices based on the control signaling;
  a Human Machine Interface (HMI) component hosted by an on-site HMI device configured to display a visualization of the machine learning component and receive the operational data from the machine learning component; and
  in response to a user selection, the HMI component configured to display an expanded view of the machine learning component and that comprises the operational data that characterizes the machine learning outputs and the control signaling and that indicates operational relationships between the machine learning component, the PLC, and the industrial devices.

2. The system of claim 1 wherein:
  the HMI component is configured to display a list of the machine learning outputs and information context associated with individual ones of the machine learning outputs.

3. The system of claim 2 wherein the information context indicates ones of the industrial devices influenced by the control signaling.

4. The system of claim 1 wherein:
  the machine learning outputs comprises machine learning predictions; and
  the HMI component is configured to display a predication accuracy percentage for the machine learning component based on the machine learning predictions.

5. The system of claim 4 wherein the predication accuracy percentage for the machine learning model comprises an r-squared value.

6. The system of claim 1 wherein:
  the machine learning outputs comprises machine learning predictions; and
  the HMI component is configured to display a percent accuracy for the machine learning component based on the machine learning predictions; and
  the HMI component is further configured to receive user input to disable the machine learning component and transfer signaling to an industrial control component to disable the machine learning component; and further comprising:
  the industrial control component configured to receive the signaling and responsively disable the machine learning component.

7. The system of claim 1 wherein the HMI component is configured to display control signaling context for the machine learning component.

8. A method to visualize machine learning model status in an industrial automation environment, the method comprising:
- a machine learning component receiving process inputs associated with industrial devices in the industrial automated environment, processing the inputs to generate machine learning outputs that comprise control signaling to influence one or more functions of the industrial devices, transferring the control signaling to a Programmable Logic Controller (PLC), and reporting operational data characterizing the machine learning outputs and control signaling, wherein the PLC influences one or more functions of the industrial devices based on the control signaling;
- a Human Machine Interface (HMI) component hosted by an on-site HMI device displaying a visualization of the machine learning component and receiving the operational data from the machine learning component; and
- in response to a user selection, the HMI component displaying an expanded view of the machine learning component and that comprises the operational data that characterizes the machine learning outputs and the control signaling and that indicates operational relationships between the machine learning component, the PLC, and the industrial devices.

9. The method of claim 8 wherein:
- the HMI component displaying the expanded view comprises the HMI component displaying a list of the machine learning outputs and information context associated with individual ones of the machine learning outputs.

10. The method of claim 9 wherein the information context indicates ones of the industrial devices influenced by the control signaling.

11. The method of claim 8 wherein:
- the machine learning outputs comprises machine learning predictions; and
- the HMI component displaying the expanded view comprises the HMI component displaying a predication accuracy percentage for the machine learning component based on the machine learning predictions.

12. The method of claim 11 wherein the predication accuracy percentage for the machine learning model comprises an r-squared value.

13. The method of claim 8 wherein:
- the machine learning outputs comprises machine learning predictions; and
- the HMI component displaying the expanded view comprises the HMI component displaying a percent accuracy for the machine learning component based on the machine learning predictions; and further comprising:
- the HMI component receiving user input to disable the machine learning component and transferring signaling to an industrial control component to disable the machine learning component; and
- the industrial control component receiving the signaling and responsively disabling the machine learning component.

14. The method of claim 8 wherein the HMI component displaying the expanded view comprises the HMI component displaying control signaling context for the machine learning component.

15. A non-transitory computer-readable medium storing instructions to visualize machine learning model status in an industrial automation environment, wherein the instructions, in response to execution by a processor, cause the processor to drive a system to perform operations comprising:
- receiving process inputs associated with industrial devices in the industrial automated environment, processing the inputs to generate machine learning outputs that comprise control signaling to influence one or more functions of the industrial devices, and transferring the control signaling to a Programmable Logic Controller (PLC) wherein the PLC influences one or more functions of the industrial devices based on the control signaling;
- displaying, via an on-site Human Machine Interface (HMI), a visualization of a machine learning component; and
- in response to a user selection via the on-site HMI, displaying an expanded view of the machine learning component that comprises operational data that characterizes the machine learning outputs and the control signaling and operational relationships between the machine learning component, the PLC, and the industrial devices.

16. The non-transitory computer-readable medium of claim 15, the operations further comprising:
- displaying a list of the machine learning outputs and information context associated with individual ones of the machine learning outputs.

17. The non-transitory computer-readable medium of claim 16 wherein the information context indicates ones of the industrial devices influenced by the control signaling.

18. The non-transitory computer-readable medium of claim 15, the operations further comprising:
- displaying a predication accuracy percentage for the machine learning component based on machine learning predictions.

19. The non-transitory computer-readable medium of claim 18 wherein the predication accuracy percentage for the machine learning model comprises an r-squared value.

20. The non-transitory computer-readable medium of claim 15, the operations further comprising:
- displaying a percent accuracy for the machine learning component based on machine learning predictions;
- receiving user input to disable the machine learning component; and
- transferring signaling to an industrial control component to disable the machine learning component.

* * * * *